(12) United States Patent
Takayama et al.

(10) Patent No.: US 7,693,895 B2
(45) Date of Patent: Apr. 6, 2010

(54) USER-FRIENDLINESS IN IMAGE LIST DISPLAY

(75) Inventors: Takaharu Takayama, Kazushima (JP); Shinji Ehara, Beppu (JP)

(73) Assignee: Seiko Epson Corporation, Tokyo (JP)

( * ) Notice: Subject to any disclaimer, the term of this patent is extended or adjusted under 35 U.S.C. 154(b) by 228 days.

(21) Appl. No.: 11/641,275

(22) Filed: Dec. 18, 2006

(65) Prior Publication Data

US 2007/0156708 A1 Jul. 5, 2007

(30) Foreign Application Priority Data

Dec. 19, 2005 (JP) ............................. 2005-365335

(51) Int. Cl.
*G06F 17/30* (2006.01)

(52) U.S. Cl. ............................. 707/705; 707/E17.121

(58) Field of Classification Search ............. 707/1–100, 707/104.1, E17.121; 382/128, 305; 718/102, 718/107; 709/217
See application file for complete search history.

(56) References Cited

U.S. PATENT DOCUMENTS

| | | | | |
|---|---|---|---|---|
| 6,169,998 | B1 * | 1/2001 | Iwasaki et al. | 715/202 |
| 6,963,672 | B1 * | 11/2005 | Watanabe et al. | 382/305 |
| 2002/0102012 | A1 * | 8/2002 | Keller et al. | 382/128 |
| 2003/0071849 | A1 * | 4/2003 | Ferri | 345/777 |
| 2004/0255003 | A1 * | 12/2004 | Tecu et al. | 709/217 |
| 2005/0088681 | A1 * | 4/2005 | Hosoda | 358/1.14 |
| 2005/0210155 | A1 * | 9/2005 | Oeda et al. | 709/249 |

FOREIGN PATENT DOCUMENTS

JP         2000-357169         12/2000

* cited by examiner

*Primary Examiner*—Tim T. Vo
*Assistant Examiner*—Shiow-Jy Fan
(74) *Attorney, Agent, or Firm*—Nutter McClennen & Fish LLP; John J. Penny, Jr.

(57) ABSTRACT

A network device comprises a Web service provider unit. In order to provide a client in a network with a service to display a list of multiple images stored in a predetermined storage area, the client having a function as a Web browser, the Web service provider unit sends the client in response to a request from the client a markup language file described in a predetermined markup language. The Web service provider unit includes a layer configuration unit and a Web program generator. The layer configuration unit configures as an element included in the markup language file at least one layer having a visibility attribute that defines whether or not the layer will be displayed on the client and assigns each of the multiple images to one of the layer. The Web program generator generates a Web program that operates on the client and sends the Web program to the client. The Web program is a program that causes the client to implement a first function to set the visibility attribute of the layer and a second function to issue a request to obtain each of the multiple images such that each of the multiple images is respectively placed on the layer to which the image is assigned.

9 Claims, 9 Drawing Sheets

| LAYER | IMAGE | POINTER |
|---|---|---|
| 1 | 001 | O |
| 1 | 002 | |
| ⋮ | ⋮ | |
| 1 | 008 | |
| 2 | 009 | |
| ⋮ | ⋮ | |
| 4 | 031 | |
| 4 | 032 | |

USER-FRIENDLINESS IN IMAGE LIST DISPLAY

CROSS REFERENCE TO RELATED APPLICATIONS

The present application claims the priority based on Japanese Patent Application No. 2005-365335 filed on Dec. 19, 2005, the disclosure of which is hereby incorporated herein by reference in its entirety.

BACKGROUND

1. Technical Field

The present invention relates to a technology to improve user-friendliness in image list displaying on a client having a function as a Web browser in a network.

2. Description of the Related Art

Technologies that cause a list of multiple images to be displayed on a Web browser based on multiple image data are known in the prior art (see JP2000-357169A, for example). Such technologies used to display a list of images are applied in a network system that includes a Web server and a client having a Web browser function.

In such image list display in a network system, when a client issues a request for image list display, a Web server generates an HTML file in which are embedded URLs for multiple image data and sends this HTML file to the client. The client receives and interprets the HTML file and issues requests to obtain the image data specifying the URLs for the image data embedded in the HTML file. When the client performs display processing after receiving the image data sent in response to the requests, a list display page that includes multiple images is displayed on the client.

In image list display in a network system, because requests to obtain all of image data whose URLs are embedded in the HTML file are simultaneously issued from the client, the burden on the network and a server that provides the image data is substantial. As a result, the time required for image list display increases, which reduces user-friendliness.

On the other hand, in image list display in a network system, the multiple images may be distributed among multiple HTML files allocating a prescribed number of images for each HTML file, enabling all images to be displayed by switching pages. In this case, because the image data sought to be obtained by a client at any one time are limited to those allocated to a single HTML file, the burden on the network and the server that provides the image data can be distributed. However, in this case, each time the page is switched on the client, an HTML file and image data are sent and received and the burden on the network is still substantial. As a result, the time required for image list display increases, reducing user-friendliness.

SUMMARY

An object of the present invention is to provide a technology that enables user-friendliness to be improved when a client having a function as a Web browser in a network is caused to implement image list display.

In one aspect of the present invention, there is provided a network device. The network device comprises a Web service provider unit. In order to provide a client in a network with a service to display a list of multiple images stored in a predetermined storage area, the client having a function as a Web browser, the Web service provider unit sends the client in response to a request from the client a markup language file described in a predetermined markup language. The Web service provider unit includes a layer configuration unit and a Web program generator. The layer configuration unit configures as an element included in the markup language file at least one layer having a visibility attribute that defines whether or not the layer will be displayed on the client and assigns each of the multiple images to one of the layer. The Web program generator generates a Web program that operates on the client and sends the Web program to the client. The Web program is a program that causes the client to implement a first function to set the visibility attribute of the layer and a second function to issue a request to obtain each of the multiple images such that each of the multiple images is respectively placed on the layer to which the image is assigned.

This network device sends, in response to a request from the client, a markup language file and a Web program. The sent Web program is a program that causes the client to implement a first function to set layer visibility. Accordingly, the client can change the displayed page by setting the visibility attribute for the layers. Therefore, regardless the number of times that the user changes the displayed page, the markup language file is sent and received between the network device and the client only once initially, and image data transmission and receipt occurs only once for each image. As a result, using this network device, the burden on the network when the displayed page is changed on the client can be reduced. This network device can thus accelerate list display processing for multiple images and improve user-friendliness.

The present invention can be realized in various aspects. For example, the present invention can be realized in aspects such as a network device, server device, printing apparatus, service providing method or image display method, a computer program for effecting the functions of such methods or devices, a recording medium for recording such a computer program, and data signals in which such a computer program is carried on the carrier wave.

These and other objects, features, aspects, and advantages of the present invention will become more apparent from the following detailed description of the preferred embodiments with the accompanying drawings.

DESCRIPTION OF THE PREFERRED EMBODIMENT

Next, aspects of the present invention will be described in the following order on the basis of embodiments:
A. First Embodiment
B. Second Embodiment
C. Variations

A. First Embodiment

Figure 1:
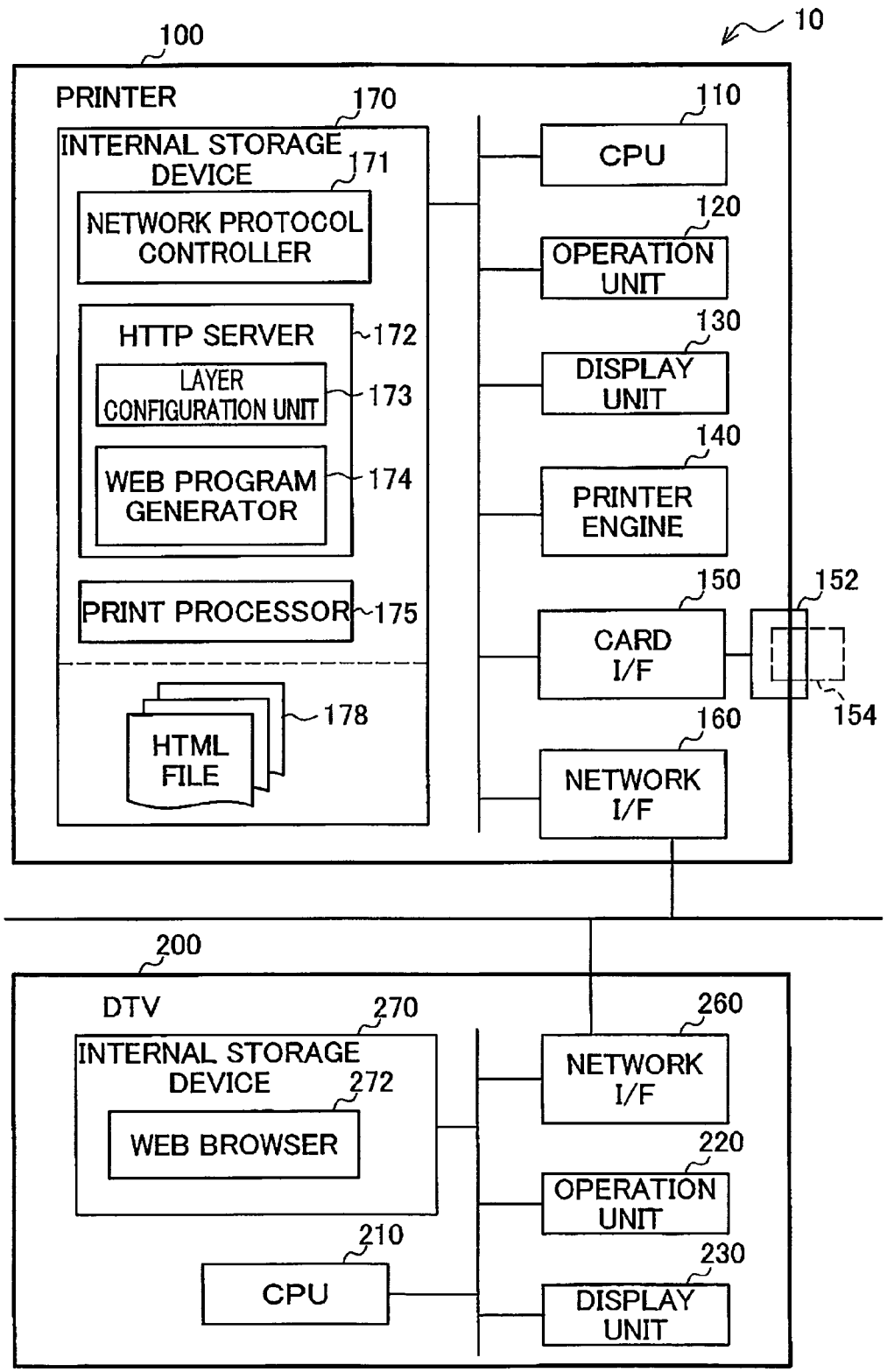
FIG. 1 is a block diagram showing schematically the construction of a network system in a first embodiment of the present invention.

FIG. 1 is a block diagram showing schematically the construction of a network system in a first embodiment of the present invention. A network system 10 comprises a printer 100 and a digital TV (hereinafter 'DTV') 200 that are mutually connected via a LAN. The LAN may comprise a wired network such as an IEEE 802.3 standard-based network or a wireless network such as an IEEE 802.11b/g/a standard-based network.

The printer 100 and DTV 200 are both Universal-Plug-and-Play (hereinafter referred to as 'UPnP' (UPnP is a trademark of UPnP Implementers Corporation)) compatible network devices. Here, UPnP is an architecture that permits a network device to be connected or disconnected to or from the network at any time. A UPnP network comprises a control point and a device. A 'device' refers to an apparatus that provides service. In this Specification, unless otherwise stated, 'device' and 'service device' are used as synonyms. A 'control point' refers to a controller that detects and/or controls other devices on the network, and functions as a client of the service device. In this Specification, the architecture that realizes plug-and-play functionality in a network, such as UPnP, is called 'network-type plug-and-play'.

The printer 100 functions as a service device in the UPnP network and provides an image print service to the control point. The printer 100 includes a CPU 110, an operation unit 120 comprising buttons, a touch panel and the like, a display unit 130 comprising a liquid crystal monitor or the like, a printer engine 140, a card interface (card I/F) 150, a network interface (network I/F) 160, and an internal storage device 170 such as a ROM or RAM.

The printer engine 140 is a printing mechanism that performs printing based on print data. The card interface 150 is an interface that exchanges data with a memory card 154 inserted in a card slot 152. The network interface 160 has a function to mediate messages and data exchanged with other devices on the network.

A network protocol controller 171, HTTP server program (hereinafter referred to as 'HTTP server') and a printing processor 175, each comprising a computer program that operates under a prescribed operating system, are stored on the internal storage device 170 of the printer 100. The HTTP server 172 includes a layer configuration unit 173 and a Web program generator 174. Multiple HTML files 178 are also stored on the internal storage device 170.

The network protocol controller 171 is a computer program to mediate messages and data between the printer 100 and other devices on the network system 10 in accordance with the UPnP protocol or other protocol. The HTTP server 172 is a program that sends an HTML file 178 or the like in response to a request from a client such as the Web browser. The layer configuration unit 173 is a program module that configures layers described below, which are elements included in an HTML file, and assigns each of the multiple images stored on the memory card 154 to one layer. The Web program generator 174 is a program module to generate a Web program (i.e., JavaScript, for example) that operates on the client. The printing processor 175 is a program that controls the printer engine 140 to perform image printing based on image data stored on the memory card 154. The CPU 110 implements the list display process and print process described below by reading these programs from the internal storage device 170 and executing them. The CPU 110 and HTTP server 172 function as the Web service provider unit of the present invention. The HTTP server 172 is also called a Web server or a WWW server.

The DTV 200 functions as a control point on the UPnP network. In this embodiment, the DTV 200 functions as a client of the printer 100 that serves as a service device. The DTV 200 includes a CPU 210, an operation unit 220 comprising buttons, a remote control unit, a remote control photoreceptor and the like, a display unit 230 comprising a liquid crystal panel or the like, a network interface (network I/F) 260, and an internal storage device 270 comprising a ROM or RAM. The network interface 260 has a function to mediate messages and data exchanged with other devices on the network.

A Web browser program (hereinafter referred to as a 'Web browser'), which is a computer program that operates under a prescribed operating system, is stored on the internal storage device 270 of the DTV 200. The Web browser 272 is a program that receives HTML files and the like and analyzes them in order to display them as Web pages on the display unit 230. The CPU 210 implements the list display process and print process described below by reading the Web browser 272 from the internal storage device 270 and executing the Web browser 272.

UPnP implements the various types of processing described below using various protocols, such as HTTPMU, HTTPU, SOAP/HTTP and HTTP.

(1) Addressing: When a UPnP device (hereinafter referred to simply as a 'device') is connected to a network, the device obtains a network address (IP address) via addressing. The DHCP server or Auto-IP is used for addressing. Where the network has a DHCP server, the device uses the IP address assigned by the DHCP server. When there is no DHCP server, the device determines its own address using an automatic IP addressing function called Auto-IP.

(2) Discovery: Discovery is processing performed by the control point to locate a device. Discovery can be implemented by the control point multi-casting a discovery message, or by the device advertising to the control point that it has joined the network. Discovery is carried out using HTTPMU/SSDP or HTTPU/SSDP. As a result of discovery, the control point and the device are enabled to proceed with processing on a peer-to-peer basis.

(3) Description: Device structure details are described as a device description using XML. Device service details are described as a service description using XML. These descriptions are owned by the device and are provided to the control point. The control point can learn the device and service details by referring to these descriptions.

(4) Control: Control is a processing performed by the control point to control the device by forwarding to the device a control message including an action request. Control is performed using HTTP/SOAP.

(5) Event: When a prescribed event occurs, a service in the device notifies the control point of such event. The control point that wishes to receive notification of the event 'subscribes' to that service. The event is forwarded to the control point that has subscribed. Notification of an event is performed using HTTP/GENA.

(6) Presentation: Presentation is processing performed by the control point to obtain a presentation page described using HTML from a presentation URL registered in the device description. Via this presentation, the control point can display the various states of the device, for example.

The present invention can be applied to future versions of UPnP. In addition, the present invention can also be applied to network-type plug-and-play specifications other than UPnP if the network-type plug-and-play specification provides an architecture in which a control point and a device can communicate with each other on a peer-to-peer basis via addressing (automatic IP address determination) and device discovery to enable the control point and the device to exchange messages.

Figure 2:
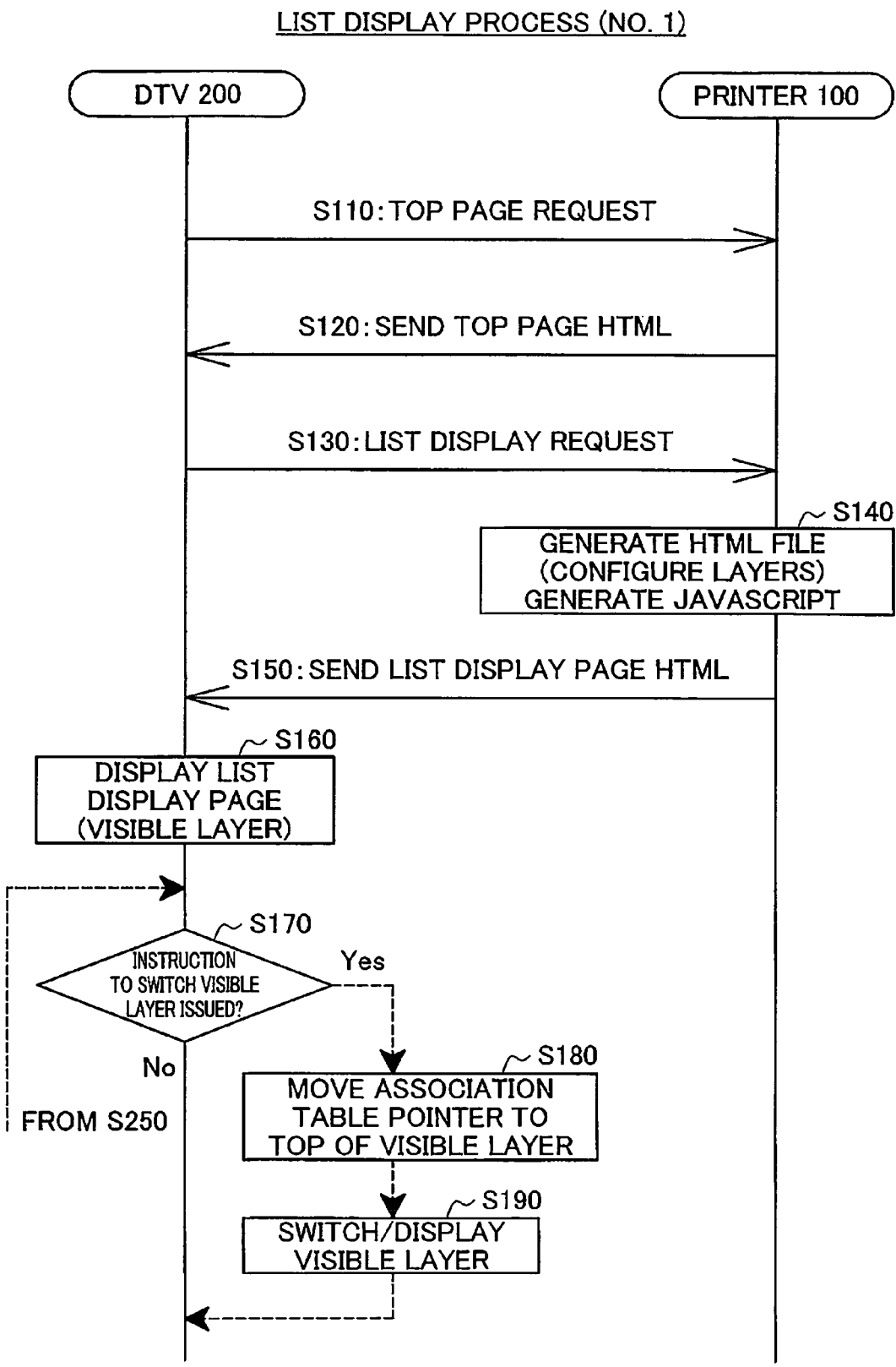
FIG. 2 is a flow chart showing the sequence of operations executed during the list display process performed by the network system 10 of this embodiment.
Figure 3:
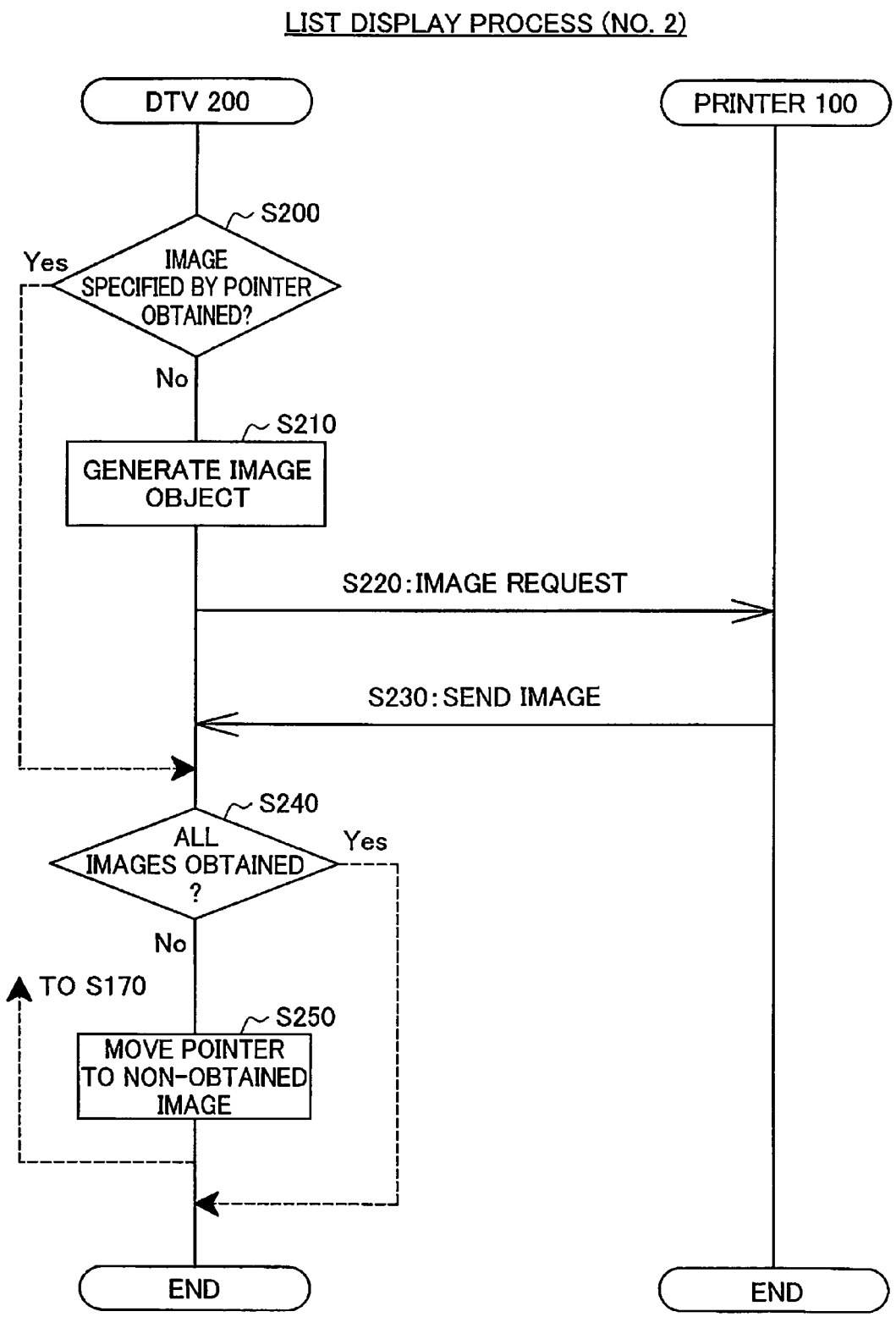
FIG. 3 is a flow chart showing the sequence of operations executed during the list display process performed by the network system 10 of this embodiment.

FIGS. 2 and 3 are flow charts showing the sequence of operations of the list display process performed by the network system 10 of this embodiment. The list display process of this embodiment is a process executed to display on the display unit 230 of the DTV 200 a list of thumbnail images included in the image data (image files) stored on the memory card 154 in accordance with an instruction issued by the user via the operation unit 220 of the DTV 200.

It is assumed that in the network system 10 (see FIG. 1), the printer 100 and DTV 200 join the network system 10 prior to the commencement of the list display process, and know each other's existence and IP address via UPnP addressing, discovery and the like. In addition, it is also assumed that the DTV 200 knows the device structure and service contents of the printer 100, which serves as a device, via the UPnP descriptions.

In step S110 (see FIG. 2), the Web browser 272 of the DTV 200 (see FIG. 1) requests the top page of the printer 100. This operation is executed in response to a user operation to request the printer top page carried out via the operation unit 220 of the DTV 200. In this embodiment, the printer 100 top page is a UPnP presentation page, and the URL thereof is registered in device description of the printer 100. The Web browser 272 requests the presentation URL registered in the device description.

Figure 4:
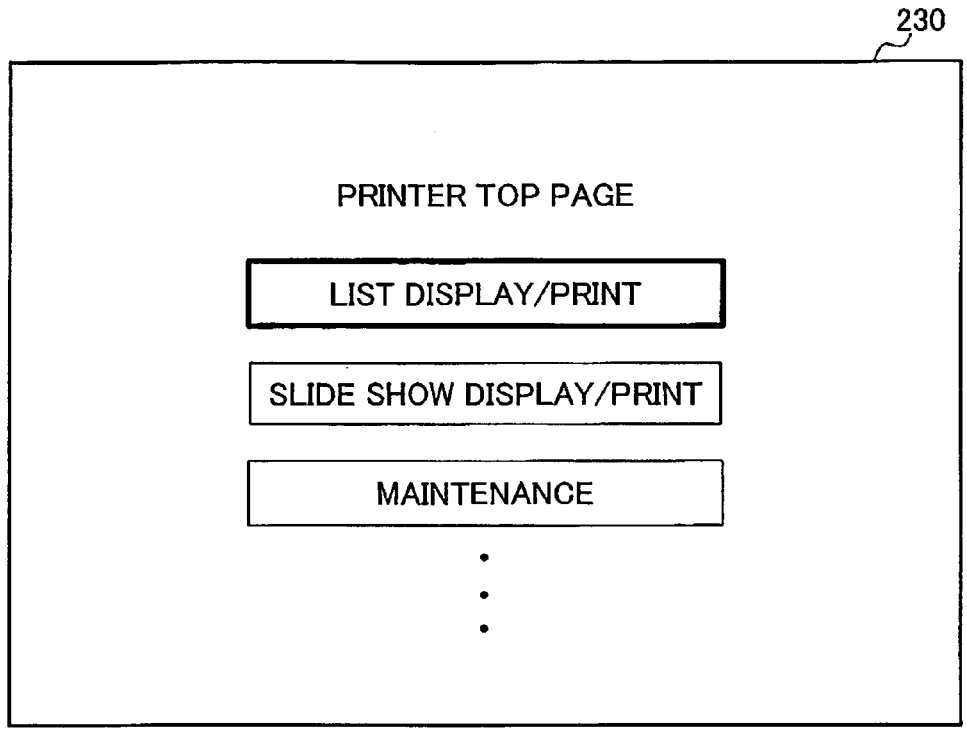
FIG. 4 is a diagram showing an example of a printer top page.

In step S120 (see FIG. 2), in response to the request from the DTV 200 in step S110, the HTTP server 172 of the printer 100 (see FIG. 1) sends the HTML file 178 of the printer top page. Consequently, the printer top page is displayed on the display unit 230 of the DTV 200 (see FIG. 1). FIG. 4 is a diagram showing one example of the printer top page. As shown in FIG. 4, the printer top page includes buttons by which the user selects various services provided by the printer 100.

As shown in FIG. 4, in this embodiment, the printer 100 has 'List display/print' as a service provided to the DTV 200. 'List display/print' in this embodiment is a service that displays on the display unit 230 in the form of a list thumbnail images included in the image data (image files) stored on the memory card 154 and prints images selected by the user from among such list. The list display process of this embodiment is part of the processing executed in order to implement this list display/print service.

In step S130 (see FIG. 2), the Web browser 272 of the DTV 200 (see FIG. 1) requests a list display page. This operation is executed in response to user selection of the 'List display/print' button on the printer top page shown in FIG. 4.

Figure 5:
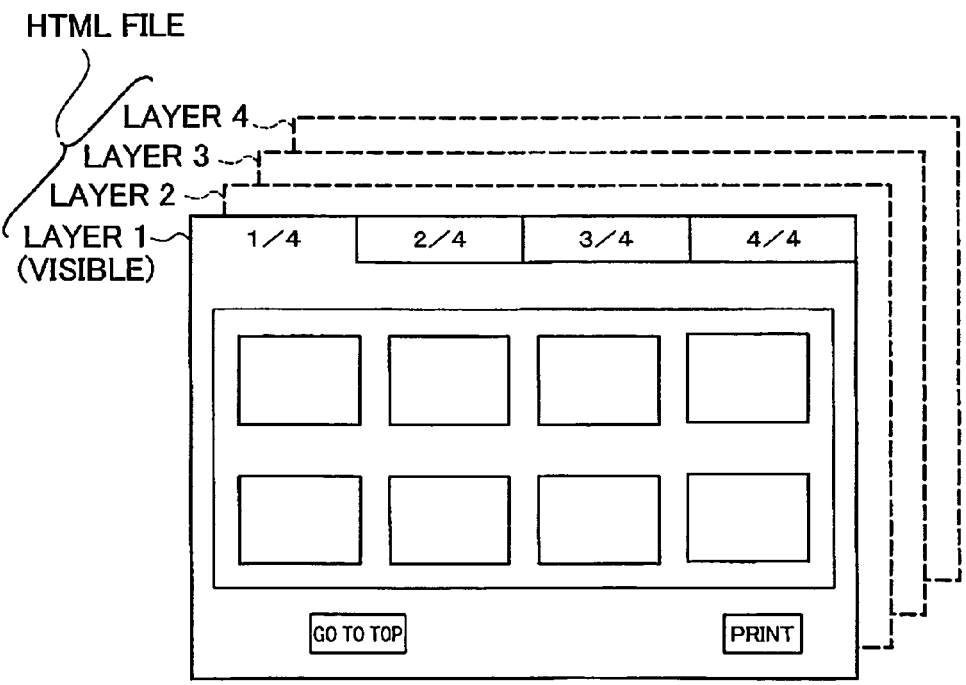
FIG. 5 is a diagram showing in a conceptual fashion the list display HTML file used in this embodiment.

In step S140, the HTTP server 172 of the printer 100 generates a HTML file for the list display. FIG. 5 is a diagram showing in a conceptual fashion a HTML file for the list display used in this embodiment. As shown in FIG. 5, the HTML file for the list display used in this embodiment includes at least one layer. Here, a layer is one element of the Web page described as an HTML file and is defined using a tag. Elements (also referred to as 'objects') comprising text or images may be placed on a layer.

In addition, a layer has an attribute (hereinafter referred to as the 'visibility attribute') to define whether or not the layer will be displayed on the client, in addition to attributes that define the size of the layer, location of the layer and the like. Where the visibility attribute of a layer is set to 'display', that layer is displayed on the client, and if the visibility attribute of a layer is set to 'no display', that layer is not displayed on the client. In this specification, a layer whose visibility attribute is set to 'display' is called a 'visible layer', while a layer whose visibility attribute is set to 'no display' is called an 'invisible layer'.

In this embodiment, the layer configuration unit 173 of the HTTP server 172 (see FIG. 1) configures layers of the HTML file for the list display in accordance with the number of image data stored on the memory card 154. Specifically, the number of layers is set based on a preset number of images per layer to enable all image data stored on the memory card 154 to be assigned. In this embodiment, the number of images per layer is set to eight. Therefore, if 32 image data are stored on the memory card 154, four layers are configured (see FIG. 5). In this embodiment, when layers are configured, the visibility attribute for the first layer (the layer 1) only is set to 'display' and the visibility attribute for the other layers (the layers 2-4) is set to 'no display'.

Figures 6, 7:
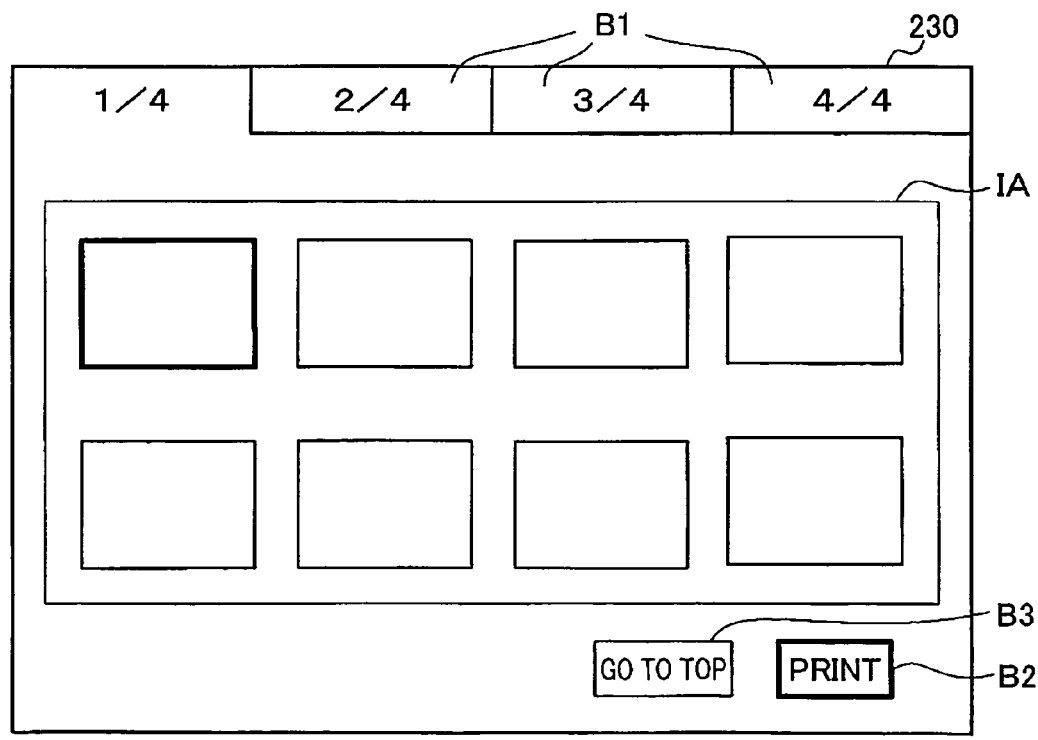
FIG. 6 is a diagram showing an example of a table that associates layers and image data.
FIG. 7 is a diagram showing an example of a list display page.

The layer configuration unit 173 of the HTTP server 172 also generates a association table that indicates the association between layers and image data. FIG. 6 is a diagram showing one example of the association table. The association table is generated by assigning the preset number of image data per layer to each layer configured. For example, eight image with identifiers '001' through '008' are assigned to the layer 1. In this embodiment, multiple image stored on the memory card 154 are assigned in the order of storage starting with the topmost cell of the association table (the first image for the first layer) downward.

The association table also includes a pointer that specifies one image data in the association table as shown in FIG. 6. At the initialized state, the pointer is located at a position that specifies the image data assigned to the first position of the layer 1. The generated association table is embedded in the HTML file for the list display.

In step S140 (see FIG. 2), the Web program generator 174 of the HTTP server 172 (see FIG. 1) generates JavaScript, which serves as a Web program that operates on the client. This JavaScript is a program that causes the client (i.e., the Web browser 272) to implement a first function to set or change the visibility attribute for layers and a second function to embed image objects corresponding to image data assigned to the layers in order to issue requests to obtain image data. In this embodiment, the first function is a function to set or change the visibility attribute for layers such that only one of the multiple layers included in the list display page HTML file is selected as a visible layer while the other layers are set as invisible layers.

The image objects generated via the second function mentioned above comprise elements of images assigned to each layer and are set using tags. The image objects corresponding to the image assigned to each layer are not yet embedded in the HTML file generated in step S140. Embedding of the image objects in the HTML file is executed on the client (i.e., the Web browser 272) according to the operation of the JavaScript as described below. The JavaScript generated in step S140 is embedded in the HTML file for the list display.

In step S150 (see FIG. 2), the HTTP server 172 of the printer 100 (see FIG. 1) sends the HTML file for list display page generated in step S140 to the Web browser 272 of the DTV 200. Because the HTML file for list display page has the association table (see FIG. 6) generated in step S140 as well as embedded JavaScript, the association table and JavaScript are also sent to the Web browser 272.

Upon receiving the HTML file for list display page, the Web browser 272 of the DTV 200 (see FIG. 1) executes the operations in step S160 and the following steps (see FIG. 2) while using the functions implemented via JavaScript embedded in the HTML file.

In step S160, the Web browser 272 interprets the HTML file for the list display page and displays the list display page on the display unit 230 of the DTV 200. FIG. 7 is a diagram showing one example of the list display page. As described above, when the layers are configured in step S140 (see FIG. 2), the visibility attribute for the first layer (the layer 1) only is set to 'display'. Therefore, when the HTML file for the list display page is received by the Web browser 272, as shown in FIG. 7, only the page corresponding to the layer 1 is displayed on the display unit 230, while the pages corresponding to the other layers (the layers 2-4) are not displayed.

As shown in FIG. 7, the list display page corresponding to the layer 1 includes an image list display area IA in which eight images will be shown in the form of a list. At this point, no images are displayed in the image list display area IA. The list display page corresponding to the layer 1 also includes layer selection buttons B1 by which the user issues an instruction to switch the visible layer, a 'Print' button B2 by which the user issues an instruction to perform image printing, and a 'Go to top' button B3 by which the user issues an instruction to return to the top page. The list display pages corresponding to the other layers (the layers 2-4) have a construction identical to the construction described above.

In step S170 (see FIG. 2), the Web browser 272 of the DTV 200 determines whether or not an instruction to switch the visible layer has been issued. Specifically, it is determined whether or not the user has selected any of the layer selection buttons B1. If no switch instruction has been received, the process advances to step S200 (see FIG. 3).

In step S200 (see FIG. 3), the Web browser 272 determines whether or not a thumbnail image data corresponding to a image data (hereinafter also referred to as the 'specified image data') specified by the pointer (see FIG. 6) in the association table has been obtained. In order to carry out this determination, the Web browser 272 has flags for each image data shown in the association table that indicate whether or not a corresponding thumbnail image has been obtained. For example, as described above, when the HTML file for the list display page is initially received by the Web browser 272, the image data assigned to the first position of the layer 1 is specified by the pointer. Therefore, this image data comprises the specified image data. In addition, at this point the Web browser 272 has not obtained any thumbnail image data. As a result, in this case, it is determined in step S200 that no thumbnail image data corresponding to the specified image data has been obtained. When it is determined in step S200 that the thumbnail image data corresponding to the specified image data has not been obtained, the process advances to step S210.

In step S210 (see FIG. 3), the Web browser 272 generates an image object corresponding to the specified image data and places it in the appropriate position on the appropriate layer of the HTML file for list display page. The generated image object includes the URL for the thumbnail image data corresponding to the specified image data. For example, an image object corresponding to the image data assigned to the first position of the layer 1 is placed at the position corresponding to the upper left corner area of the image list display area IA of the layer 1 (see FIG. 7).

In step S220 (see FIG. 3), the Web browser 272 issues a request to obtain an image from the HTTP server 172 of the printer 100 based on the image object generated in step S210. Specifically, the request to obtain an image is issued by specifying the URL for the thumbnail image data corresponding to the specified image data.

Figure 8:
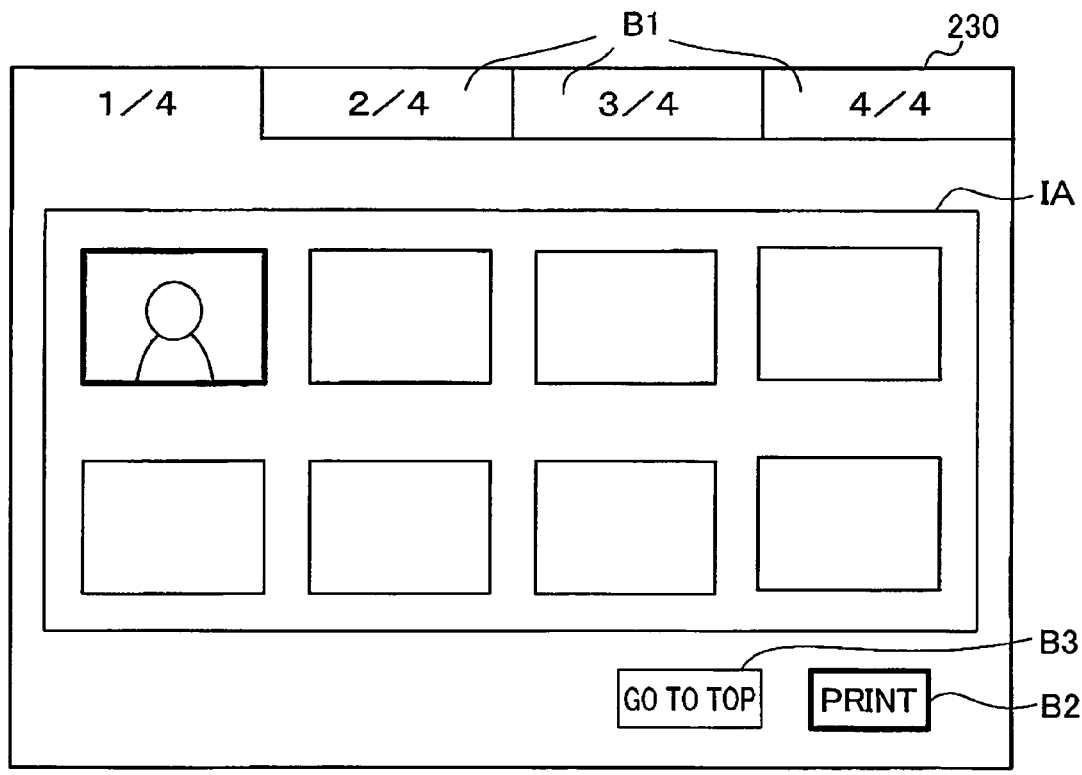
FIG. 8 is a diagram showing an example of a list display page corresponding to a layer 1.

In step S230, the HTTP server 172 of the printer 100 sends the thumbnail image data requested by the Web browser 272 of the DTV 200. The Web browser 272 receives the sent thumbnail image data and places it on the list display page. When the thumbnail image data received is assigned to the visible layer, an image is displayed in the image list display area IA of the list display page, as shown in FIG. 8. FIG. 8 shows an example in which the first image is displayed in the image list display area IA of the page corresponding to the layer 1.

On the other hand, where it is determined in step S200 (see FIG. 3) that the thumbnail image data corresponding to the specified image data has been obtained, it is not necessary to obtain such image data any longer, and therefore the operations from step S210 through S230 are skipped, and the process advances to step S240.

In step S240 (see FIG. 3), the Web browser 272 of the DTV 200 determines whether or not thumbnail image data corresponding to all image data shown in the association table (see FIG. 6) have been obtained. Where it is determined in step S240 that thumbnail image data that have not been obtained exist, the process advances to step S250.

In step S250 (see FIG. 3), the Web browser 272 of the DTV 200 moves the pointer in the association table (see FIG. 6) such that an image data for which thumbnail image data has not been obtained (hereinafter also referred to as a 'non-obtained image data') is deemed the specified image data. The pointer can be moved to any non-obtained image data, but in this embodiment, the pointer is moved downward starting from the top of the association table to the non-obtained image data closest to the current specified image data. For example, where the current specified image data is the image data assigned to the first position of the layer 1 and the image data assigned to the second position of the layer 1 is a non-obtained image data, the pointer is moved such that the second image data becomes the specified image data. When the pointer has moved to the bottom cell of the association table, it returns to the top cell.

After the pointer is moved in step S250, the process returns to step S170 (see FIG. 2). Where it is determined in step S170 that no visible layer switch instruction has been issued, the operations to obtain the thumbnail image data corresponding to the specified image data described above (steps S200-230) are carried out. The pointer in the association table is moved (i.e., the specified image data is changed) and the thumbnail image data corresponding to the specified image data is obtained repeatedly in this way until it is determined in step S240 that thumbnail image data corresponding to all image data in the association table have been obtained. Where the thumbnail image data obtained is assigned to the visible layer, a thumbnail image is displayed on the image list display area IA of the list display page displayed on the display unit 230 of the DTV 200.

For example, where the user does not switch the visible layer from start to finish, the thumbnail image data corresponding to the eight image data assigned to the layer 1, which is the initial visible layer, are sequentially obtained, and eight thumbnail images are displayed in the image list display area IA (see FIG. 7) of the list display page. Subsequently, the thumbnail image data corresponding to the remaining images assigned to the layers 2-4 are sequentially obtained. Because the layers 2-4 remain invisible unless an instruction to switch the visible layer is issued, even if thumbnail image data corresponding to the images assigned to the layers 2-4 are obtained, there is no change in the display on the display unit 230 of the DTV 200.

In the Web browser 272 of the DTV 200, timer control is carried out such that a request to obtain an image (step S220) is issued at predetermined intervals. For example, wait processing is performed when an operation to generate an image object is carried out in step S210. In addition, a request to obtain an image is issued regardless of whether or not an image data requested by the previous request has been obtained.

On the other hand, where it is determined in step S170 (see FIG. 2) that an instruction to switch the visible layer has been issued, the process advances to step S180 (see FIG. 2). In step S180, the Web browser 272 of the DTV 200 moves the pointer in the association table (see FIG. 6) to the position for the image data assigned to the first position (top cell) of the new visible layer. In step S190, the Web browser 272 changes the layer visibility attributes such that a list display page corresponding to the new visible layer is displayed. In other words, the Web browser 272 changes the visibility attribute for the current visible layer to 'no display' while changing the visibility attribute for the new visible layer to 'display'.

The operations including and following step S200 (see FIG. 3) described above are then carried out. In other words, a thumbnail image data is obtained (steps S200-230) and the pointer in the association table is moved (step S250). Consequently, in the list display process of this embodiment, thumbnail image data corresponding to the image data assigned to the visible layer are obtained with priority in this way. Thumbnail image data assigned to invisible layers are obtained only if all thumbnail image data assigned to the current visible layer have been obtained.

Figure 9:
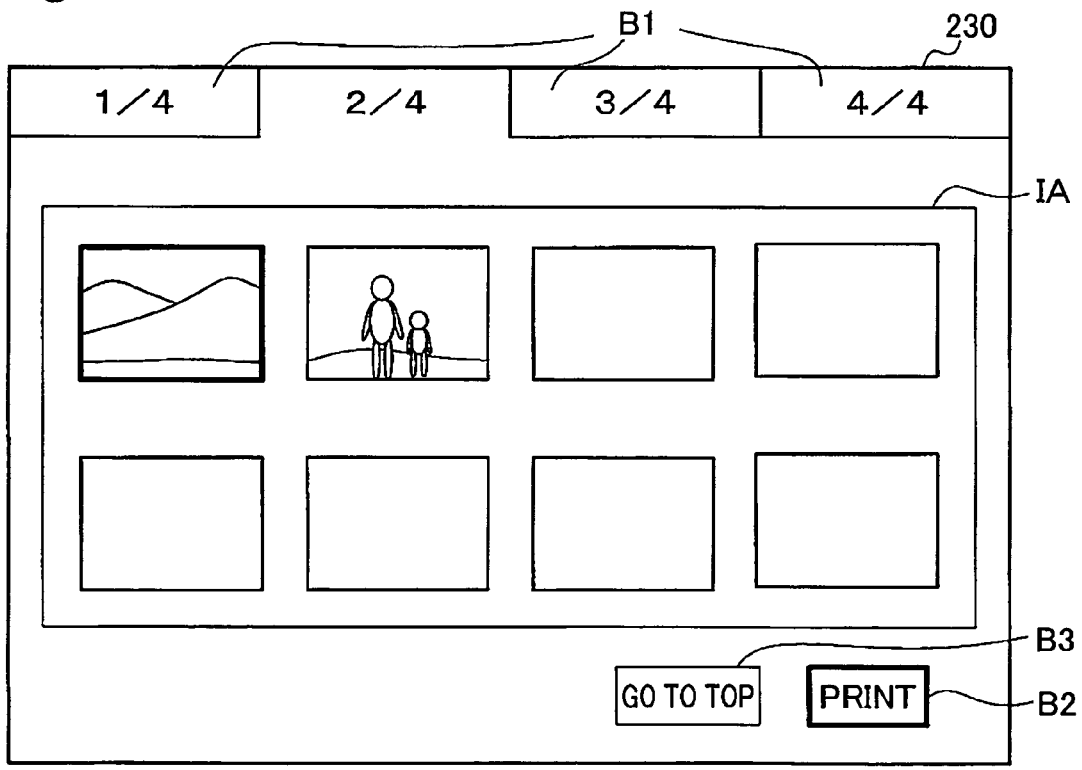
FIG. 9 is a diagram showing one example of a list display page corresponding to a layer 2.

For example, as shown in FIG. 8, where the user selects a layer selection button B1 to switch the visible layer to the layer 2 when the first image has been displayed in the list display page for the layer 1, the pointer in the association table (see FIG. 6) is moved to the position for the image data assigned to the first position of the layer 2 (step S180), and as shown in FIG. 9, a list display page corresponding to the layer 2, which is the new visible layer, is displayed (step S190). Subsequently, thumbnail images yet to be obtained are obtained and displayed sequentially starting with the image assigned to the first position of the layer 2 (steps S200-230). Where the user does not issue an instruction to switch the visible layer, all thumbnail image data corresponding to the image data assigned to the layer 2 are obtained, and eight images are displayed in the image list display area IA of the list display page corresponding to the layer 2 in this case as well. The remaining images assigned to the layers 3 and 4 are subsequently obtained in a sequential fashion, and then the remaining images assigned to the layer 1 are obtained.

When thumbnail image data corresponding to all image data shown in the association table (see Table 6) are finally obtained ('Yes' in step S240), the process ends. The visible layer may be still switched based on the selection of a layer selection button B1 by the user. However, in this case, because all image data have been obtained, only the layers' visibility attributes are changed, and no transmission and receipt of data occurs between the Web browser 272 and the HTTP server 172.

As described above, in the list display process of this embodiment, a HTML file for a list display page and a JavaScript are generated by the HTTP server 172 of the printer 100 and are sent to the Web browser 272 of the DTV 200. The Web browser 272 obtains thumbnail image data stored on the memory card 154 at predetermined intervals until all thumbnail image data are obtained. As a result, in the list display process of this embodiment, requests to obtain multiple image data are not issued in a concentrated fashion, thereby reducing the burden on the network and HTTP server 172. Therefore, in the list display process of this embodiment, the processing can be accelerated, and user-friendliness can be improved.

In the list display process of this embodiment, the displayed page is switched by Web browser 272 changing the visible layer. As a result, regardless the number of times that the user switches the page, the HTML file 178 is sent and received between the HTTP server 172 and the Web browser 272 only once initially, and image data transmission and receipt occurs only once for each image. As a result, in the list display process of this embodiment, the burden on the network, HTTP server 172 and Web browser 272 that are used for page switch can be reduced. Therefore, in the list display process of this embodiment, the processing can be accelerated, and user-friendliness can be improved. In particular, where the Web browser 272 does not have a cache function, this effect is important.

In addition, in the list display process of this embodiment, image data assigned to the visible layer are obtained with priority. In other words, the order to obtain multiple images allocated in one HTML file can be manipulated by the user. Therefore, in the list display process of this embodiment, the period of time before the user's desired images are displayed can be reduced, which further improves user-friendliness.

Figure 10:
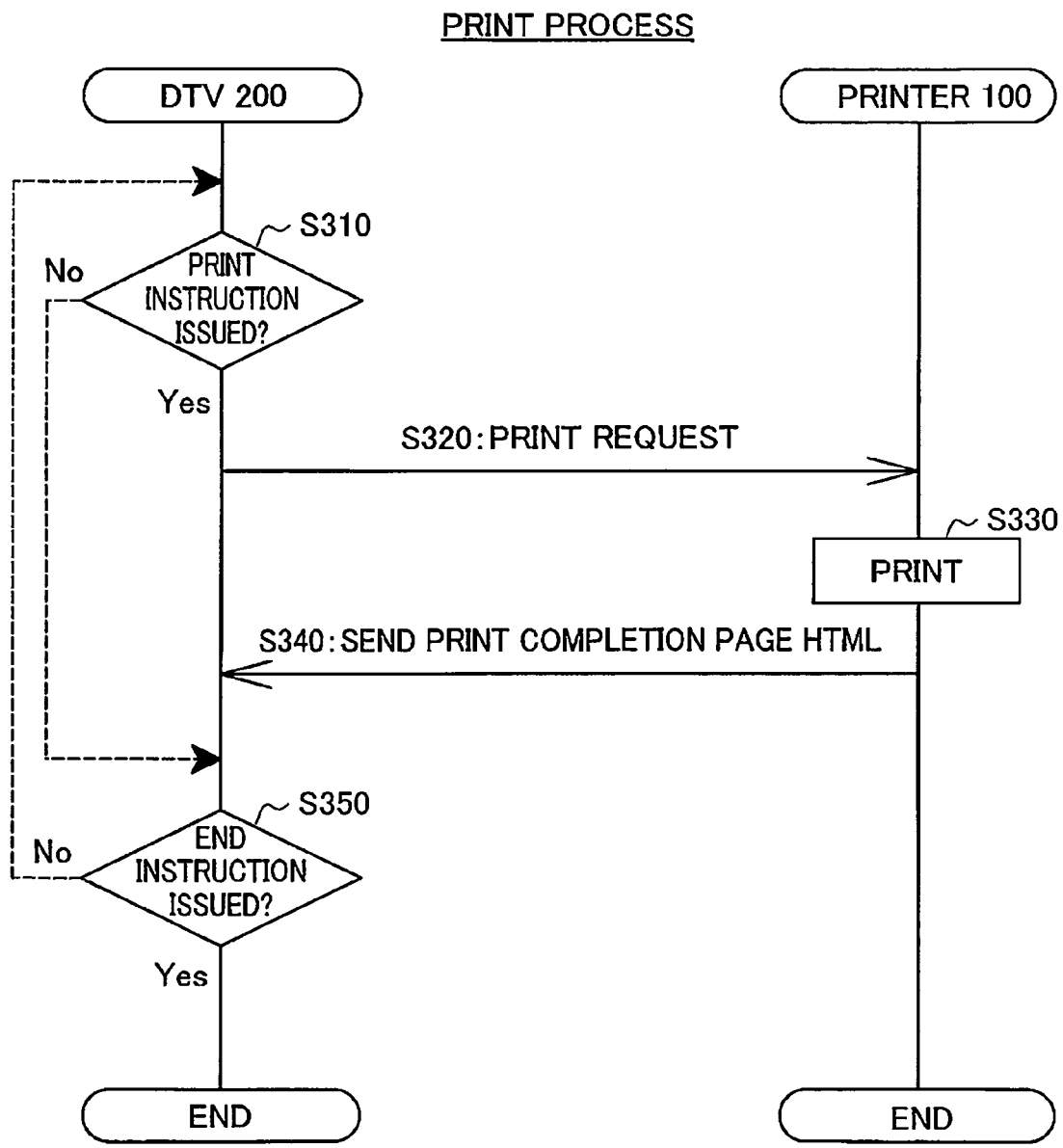
FIG. 10 is a flow chart showing the sequence of operations executed during the print process performed by the network system 10 of this embodiment.

FIG. 10 is a flow chart showing the sequence of print process performed by the network system 10 of this embodiment. The print process of this embodiment consists of processing to print, using the printer engine 140 (see FIG. 1), images that are selected by the user from among the list of images displayed via the list display process described above. The print process is begun in response to user selection of (i) an image displayed in the image list display area IA (see FIG. 7) and (ii) the 'Print' button B2.

In step S310 (see FIG. 10), the Web browser 272 of the DTV 200 (see FIG. 1) determines whether or not a print instruction has been issued from the user. Specifically, it is determined whether or not the user has selected an image displayed in the image list display area IA and the 'Print' button B2. Where it is determined that a print instruction has been issued, the process advances to step S320.

In step S320 (see FIG. 10), the Web browser 272 issues a print request to the printer 100. The print request issued by the Web browser 272 includes a print request URL and the URL for the image to be printed. The print request URL is a URL that causes the HTTP server 172 receiving the request to boot the printing processor 175 (see FIG. 1). The URL for the image to be printed is a URL for the image data corresponding to the user-selected thumbnail image. When this print process is implemented, the print processor 175 functions as a CGI (Common Gateway Interface) program.

In step S330 (see FIG. 10), the HTTP server 172 of the printer 100 boots the print processor 175 and causes it to perform printing of the image according to the print request (step S320). The print processor 175 performs printing of the image via the printer engine 140 using the image data selected from among the image data stored on the memory card 154 and specified in the print request. When printing is completed, the HTTP server 172 of the printer 100 sends a HTML file for a print completion page to the Web browser 272 (step S340). The process then advances to step S350.

On the other hand, where it is determined in step S310 (see FIG. 10) that no print instruction has been issued, the process advances to step S350. In step S350, the Web browser of the DTV 200 determines whether or not an end instruction has been issued by the user. Specifically, it is determined whether or not the user has selected the 'Go to top' button B3 (see FIG. 7). Where it is determined that no end instruction has been issued, the processing returns to step S310, whereupon the operations described above are repeated. On the other hand, where it is determined that an end instruction has been issued, the print process ends.

It is acceptable if the user print instruction includes selections pertaining to print parameters (such as paper size and paper type) to be used in the print process.

As described above, the network system 10 of this embodiment can implement the print process performed by the printer 100 to print images represented by the image data stored on the memory card 154 in accordance with user instructions issued via the display unit 230 and operation unit 220 of the DTV 200.

B. Second Embodiment

Figure 11:
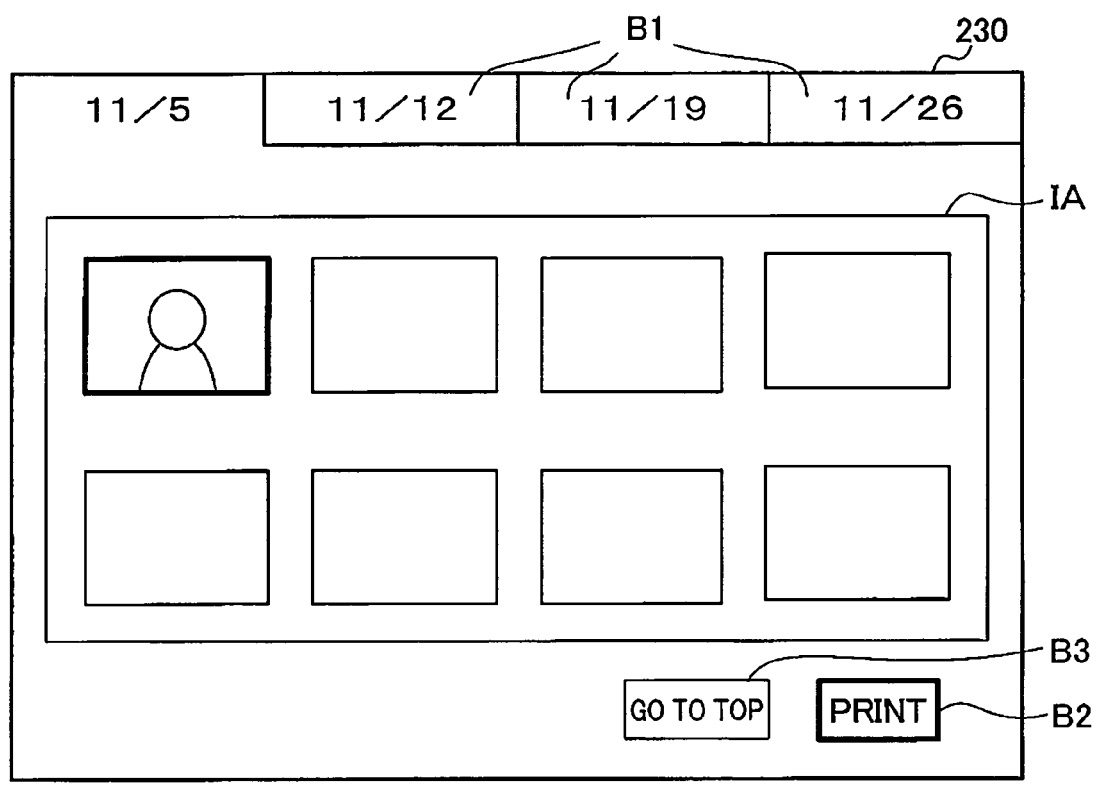
FIG. 11 is a diagram showing an example of a list display page used in the list display process of a second embodiment.

FIG. 11 is a diagram showing an example of a list display page used in the list display process of a second embodiment. The list display process of the second embodiment is different from the list display process of the first embodiment in terms of the method of configuration of layers (step S140 in FIG. 2). Specifically, in the second embodiment, layers are configured for a HTML file for a list display page in accordance with a predetermined preset image attribute used to classify the images. Here, a 'predetermined image attribute' refers to any information regarding the image, such as the date of image capture or a file name or keyword associated with the file. In this embodiment, candidates for attributes to be used for layer configuration are displayed on the display unit 230 of the DTV 200, and the attribute selected by the user is used. FIG. 11 shows an example of the list display page when the date of image capture was adopted as the image attribute.

The layer configuration unit 173 of the HTTP server 172 of the printer 100 (see FIG. 1) configures layers for the list display page HTML file in step S140 (see FIG. 2) in accordance with the image capture dates of the image data stored on the memory card 154. Specifically, layers matching the number of dates of image capture for the image data stored on the memory card 154 are configured. For example, if the image capture date for the image data stored on the memory card 154 is one of the four days of 11/5, 11/12, 11/19 and 11/26, four layers, each layer corresponding to one day, are configured (see FIG. 11). In addition, the layer configuration unit 173 generates a table associating the layers and the image data in the same manner as in the first embodiment. The association table is generated by assigning image data having a particular image capture date to the layer configured for such date. As a result, images classified by image capture date can be displayed together in the form of a list.

If the number of image data sets for one image capture date exceeds the preset number of images per layer, two or more layers are configured for one image capture date such that all image data captured on that date are assigned to a layer.

As described above, in the list display process of the second embodiment, layers for the HTML file for the list display page are configured in accordance with a predetermined preset image attribute used to classify the image, thereby enabling the list display of images classified by image attribute. Therefore, the user can easily determine the layer to which a desired image is assigned by referring to the pertinent image attribute, and by selecting this layer as the visible layer, the user can cause the Web browser 272 to quickly obtain and display the desired image. As a result, the list display process of the second embodiment can further improve user-friendliness.

C. Variations

The present invention is not limited to the embodiments and aspects described above. The present invention may be worked in various aspects within limits that involve no departure from the spirit of the invention; for example, the following variations are possible.

C1. Variation 1

Figure 12:
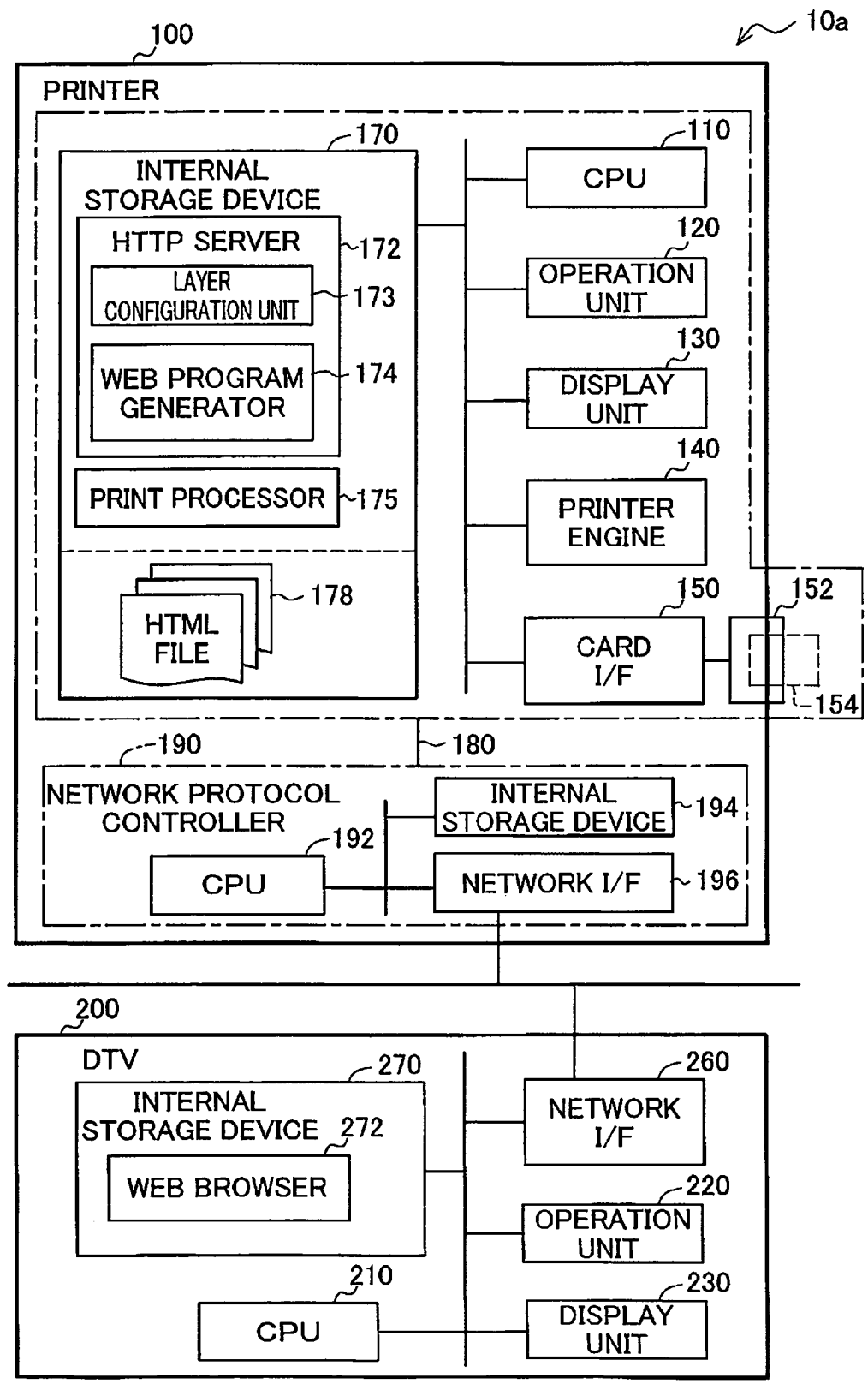
FIG. 12 is a block diagram showing schematically the construction of a network system in a variation.

The construction of the network system 10 of the embodiments described above is a mere example. The network system 10 may have a different construction. FIG. 12 is a block diagram showing schematically the construction of a network system in a variation. The network system 10a comprising a variation shown in FIG. 12 differs from the embodiments described above in that the network protocol controller 190 of the printer 100 is independent. The network protocol controller 190 of the printer 100 in the variation network system 10a includes a CPU 192, an internal storage device such as a ROM or RAM, and a network interface 196, and has functions equivalent to those of the CPU 110, network protocol controller 171 and network interface 160 in the embodiments described above. The network protocol controller 190 and the other components of the printer 100 are connected via a USB 180, for example. Because the printer 100 has the construction shown in FIG. 12, the part that performs UPnP protocol control and the part that functions as a service device can be separated, which helps increase design flexibility.

In the embodiments described above, the printer 100 has a network protocol controller 171 in order to handle UPnP, but the present invention can be applied in a printer that does not have a network protocol controller 171 and therefore does not handle UPnP. Furthermore, the present invention can be applied in network devices other than the printer 100 so long as the device includes the function of an HTTP server 172.

The embodiments described above were described using the DTV 200 as the client device, but the present invention may be applied in client devices other than the DTV 200 (such as a cellular phone) so long as the client device includes the function of a Web browser 272.

C2. Variation 2

In the embodiments described above, the image data comprising the target of list display processing were stored on the memory card 154 inserted in the printer 100, but the image data comprising the target of list display processing need not be stored in a storage area directly connected to the printer 100 serving as a network device. Image data comprising the target of list display processing may be stored in a storage area connected to the network device over a network.

C3. Variation 3

The way employed to move the pointer in the association table (see FIG. 6) (step S250 in FIG. 3) in the above embodiments was a mere example, and the pointer may be moved using a different way. In addition, in the embodiments described above, when an instruction to switch the visible layer is issued, thumbnail image data sets corresponding to the image data assigned to the new visible layer are obtained with priority by moving the pointer to the position for the image data assigned to the first position of the visible layer, but it is not essential that the image data be obtained with priority in this way.

In the embodiments described above, regarding when the visibility attribute of the layers is set and changed via JavaScript, only one of the multiple layers included in the list display page HTML file is set as a visible layer and the other layers are set as invisible layers, but it is also acceptable if two or more layers are set as visible layers. In this case, a page switch may be implemented by setting and/or switching the attribute that represents the way in which the layers overlap with each other.

In the embodiments described above, the Web browser 272 of the DTV 200 is controlled using a timer such that a request to obtain an image (step S220) is issued at predetermined intervals, but such timer control is not essential.

C4. Variation 4

The embodiments above were described using JavaScript as an example of the Web program that operates on the client, but a different program, such as VBScript, for example, may be used as the Web program. In addition, HTML was used as an example of the markup language in the descriptions of the embodiments above, but a different markup language may be used.

C5. Variation 5

The list display process in the embodiments described above is a process employed to display a list of thumbnail images, but the present invention may be applied in the list display process to display a list of actual images.

C6. Variation 6

In the embodiments described above, part of the construction implemented by hardware may be replaced by software, and part of the construction implemented by software may be replaced by hardware.

What is claimed is:

1. A network device for providing a client in a network with a service to display a list of multiple images stored in a predetermined storage area comprising:
   a Web service provider unit that sends the client a markup language file described in a predetermined markup language in response to a request from the client,
   wherein the Web service provider unit comprises:
      a layer configuration unit that configures as an element included in the markup language file, multiple layers each having a visibility attribute that defines whether or not the layer will be displayed on the client and that assigns each of the multiple images to one of the layers; and
      a Web program generator that generates a Web program that operates on the client and sends the Web program to the client, wherein the Web program is a program that causes the client to implement a first function and a second function,
   wherein the first function of the Web program is a function to set the visibility attribute of the layers such that the visibility attribute of one of the layers included in the markup language file becomes a first value indicating that the layer will be displayed on the client and the visibility attribute of the other layers becomes a second value indicating that the other layers will not be displayed on the client, and
   the second function of the Web program is a function to issue with priority a request to obtain an image assigned to a layer whose visibility attribute is set to be the first value, to issue a request to obtain an image assigned to a layer whose visibility attribute is set to be the second value when all images assigned to a layer whose visibility attribute is set to be the first value have been obtained, and to issue a request to obtain each of the multiple images at predetermined intervals,
   and wherein the second function is a function to determine, when the visibility attribute of a layer is changed to the first value, whether all images assigned to said layer have already been obtained, and to issue with priority a request to obtain any images assigned to said layer that have not already been obtained.

2. The network device according to claim 1, wherein the layer configuration unit configures a layer and assigns images to a layer such that the images assigned to the same layer have same value regarding a predetermined image attribute used to classify images.

3. The network device according to claim 1, further comprising:
   a recording medium interface to connect to a recording medium as the predetermined storage area; and
   a printing unit that performs image printing based on the image data stored on the recording medium, wherein the service provided by the Web service provider unit to the client includes image printing using the printing unit.

4. The network device according to claim 1, further comprising a network protocol controller that controls the exchange of messages between the client and the Web service provider unit in accordance with a network-type plug-and-play protocol.

5. The network device according to claim 1, wherein the layer configuration unit assigns each of the multiple images to one of the layers such that multiple images are assigned to each of the layers.

6. The network device according to claim 5, wherein the second function of the Web program is a function to issue a request to obtain each of the multiple images at predetermined intervals.

7. The network device according to claim 6, wherein the layer configuration unit configures a layer and assigns images to a layer such that the images assigned to the same layer have same value regarding a predetermined image attribute used to classify images.

8. The network device according to claim 7, further comprising:
   a recording medium interface to connect to a recording medium as the predetermined storage area; and
   a printing unit that performs image printing based on the image data stored on the recording medium, wherein the service provided by the Web service provider unit to the client includes image printing using the printing unit.

9. The network device according to claim 8, further comprising a network protocol controller that controls the exchange of messages between the client and the Web service provider unit in accordance with a network-type plug-and-play protocol.

* * * * *